G. FAST.
POWER TRANSMISSION APPARATUS.
APPLICATION FILED FEB. 19, 1918.

1,299,156.

Patented Apr. 1, 1919.
4 SHEETS—SHEET 4.

Inventor:
Gustave Fast,
by Spear, Middleton, Donaldson & Spear
Attys.

UNITED STATES PATENT OFFICE.

GUSTAVE FAST, OF MOUNT WASHINGTON, MARYLAND.

POWER-TRANSMISSION APPARATUS.

1,299,156.  Specification of Letters Patent.  Patented Apr. 1, 1919.

Application filed February 19, 1918. Serial No. 218,106.

*To all whom it may concern:*

Be it known that I, GUSTAVE FAST, a subject of the King of Sweden, and resident of Mount Washington, Maryland, have invented certain new and useful Improvements in Power-Transmission Apparatus, of which the following is a specification.

My present invention is an improvement upon the helical gear power transmission apparatus disclosed in Letters Patent of the United States, granted to me February 27, 1917, Number 1,217,427.

The invention consists in the features and combination and arrangement of parts hereinafter described and particularly pointed out in the claims.

Figure 1:
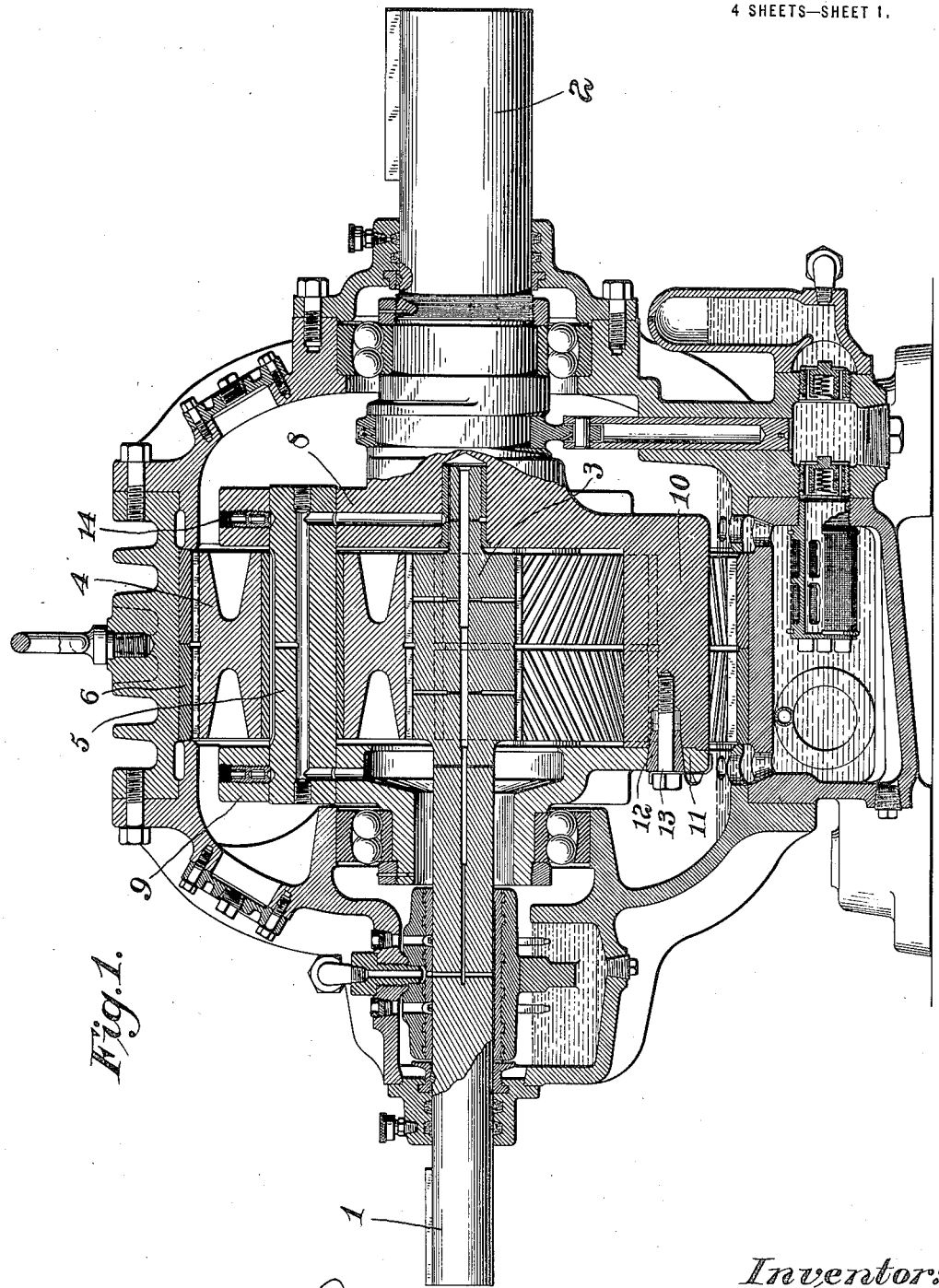
Figure 1 is a central vertical sectional view of a power transmission apparatus embodying my invention.

As in the patent above referred to the structure includes a high speed shaft 1 and a low speed shaft 2 with means for transmitting power from one of these shafts to the other, involving a center pinion 3, having helical teeth meshing with a plurality of planetary gears 4 disposed at different points about the center pinion and mounted on spindles 5, each planetary gear, as well as the pinion, having its helical teeth in right and left hand sections. The planetary gears mesh with an internal helical gear or annulus 6, having its teeth in right and left hand sections complementary to the teeth of the planetaries, this annulus being fixed to the casing 7 and performing the two-fold function of causing rotary movement of the planetaries about their axes and of holding them against endwise displacement, thereby eliminating end-thrust bearings. In the patented construction the spindles 5 of the planetary gears are mounted at one end in a head which is fixed to the low speed shaft, and at their other ends the spindles are mounted in a separate head, which surrounds the high speed shaft and turns in a bearing in the frame, this latter head, in a sense, being independent of the head first mentioned, though connected thereto by the spindles which in the patented construction form the sole connection between the two heads.

While this patented structure is practical, it is desirable to secure the highest degree of uniformity between the portions of the two ends of the spindles supporting the planetaries and to relieve these spindles of torsional strain, and of the duty of connecting the two heads with a view to securing rigidity and the maintenance of the heads, the spindles and the gears in their prescribed relative positions.

My present invention relieves the spindles of the planetary gears of the primary function of connecting the heads with a view to securing rigidity imposing this function on another feature of structure, and by my present invention a greater rigidity is obtained than is possible with the spindles when used alone as the connecting means between the heads.

Figure 2:
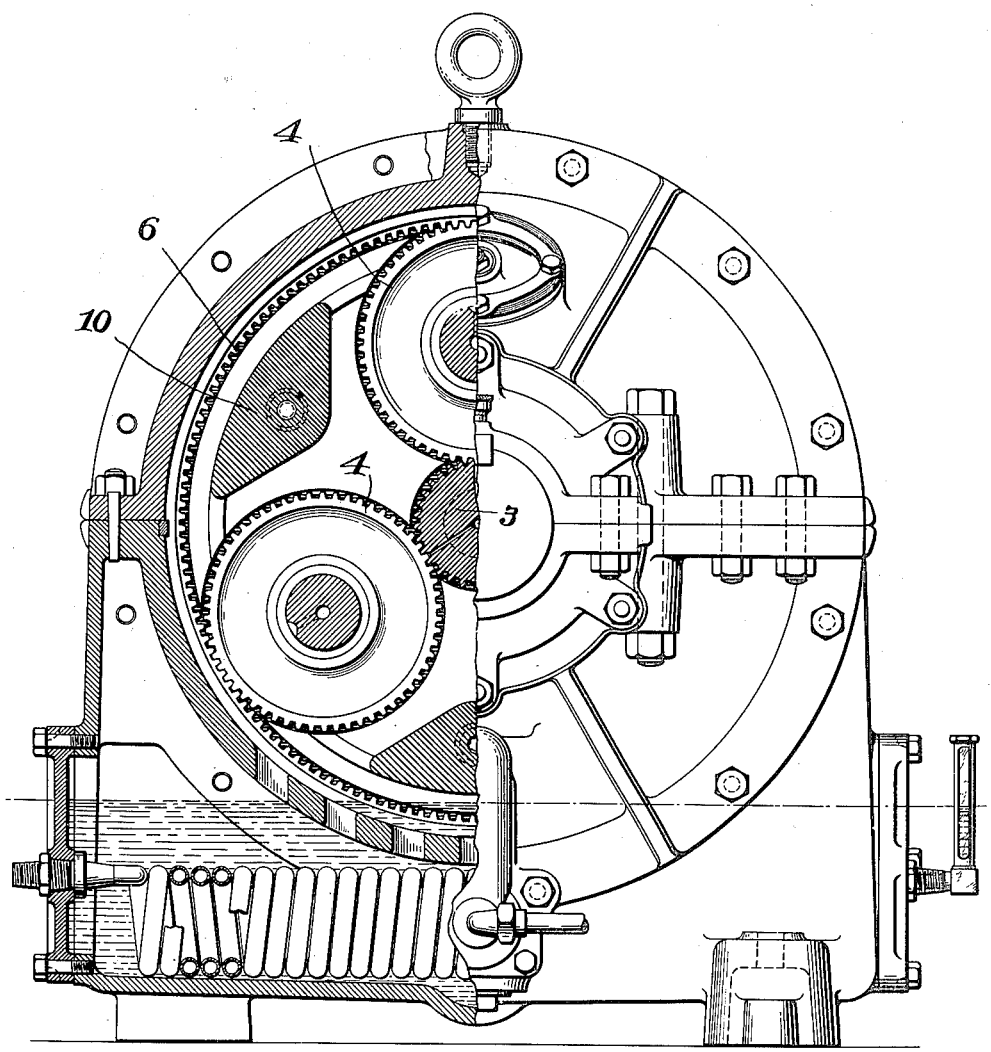
Fig. 2 is in part a cross sectional view and in part a side elevation of the structure shown in Fig. 1.

In carrying out my invention in one form, see Figs. 1 and 2, I may employ the two heads 8 and 9, related to the other part substantially as shown in the patent, but one head, 8, is provided with integral projections 10, reaching across to the other head and in the spaces between the planetary gears and these projections have their terminal end faces fitted to bear on the inner face of the opposite head 9, as shown at 11, to which head they are rigidly secured, the end face of the projections which bears against the head to which they are attached, being of sufficiently large area to give a good support to prevent the deflection of one part relative to the other. These projections are secured to the head by dowel pins 12, which are preferably of tapered form fitting tapered openings in the head and extending into conical sockets in the end of the cage projection.

These dowel pins are hollow and receive bolts 13, the ends of which are threaded into the end of the projections and by turning these bolts the two parts, the head and the projection, are drawn into close contact with the face of the projection bearing throughout its area against the inner face of the head or disk, a broad bearing, as shown in Fig. 2, being afforded to take the strain.

This construction will relieve the spindles of the planetary gears of all torsional strains and thus the helical teeth of the planetaries will be maintained in proper mesh with the internal helical teeth of the annulus and with the teeth of the center pinion.

The spindles of the planetaries being relieved of all torsional strains, and having no primary function of joining the two heads of the cage may be held in place—simply by set screws 14 passing through the heads and engaging grooves in the spindles.

Figure 3:
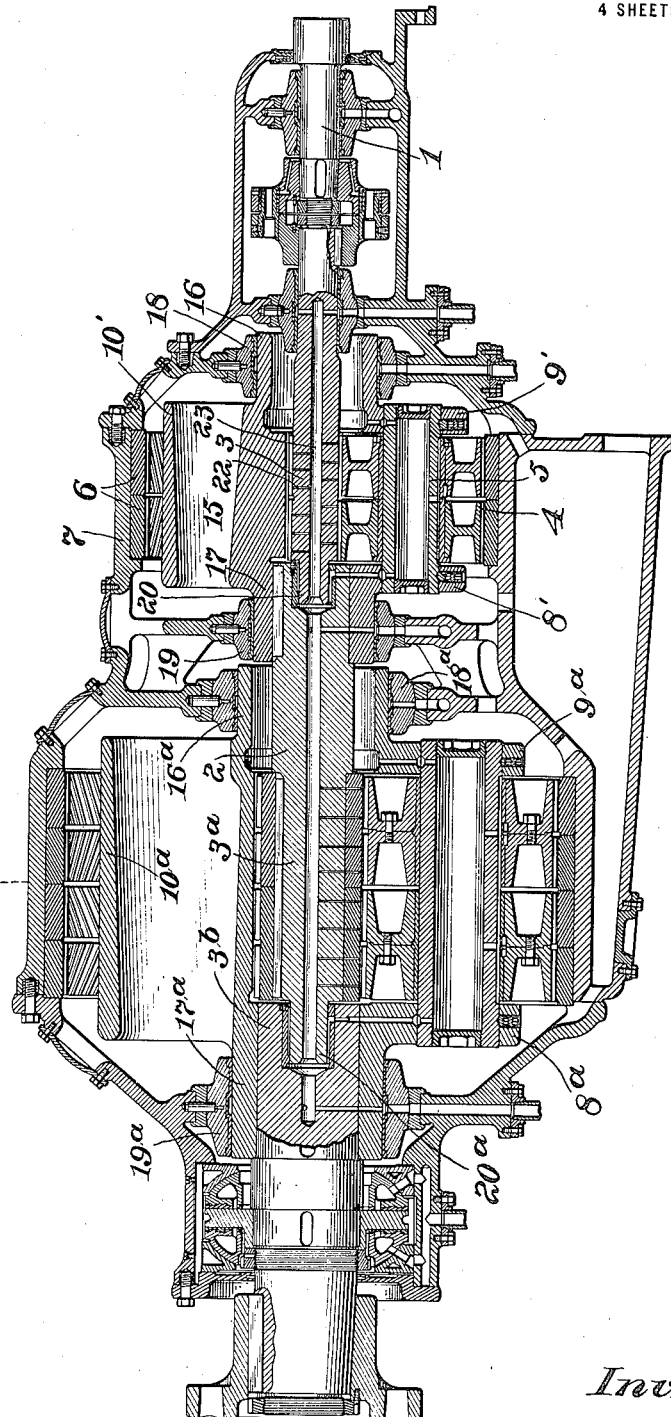
Fig. 3 is a central longitudinal sectional view of a multi-unit transmission apparatus embodying my invention in a different form from that shown in Fig. 1.
Figure 4:
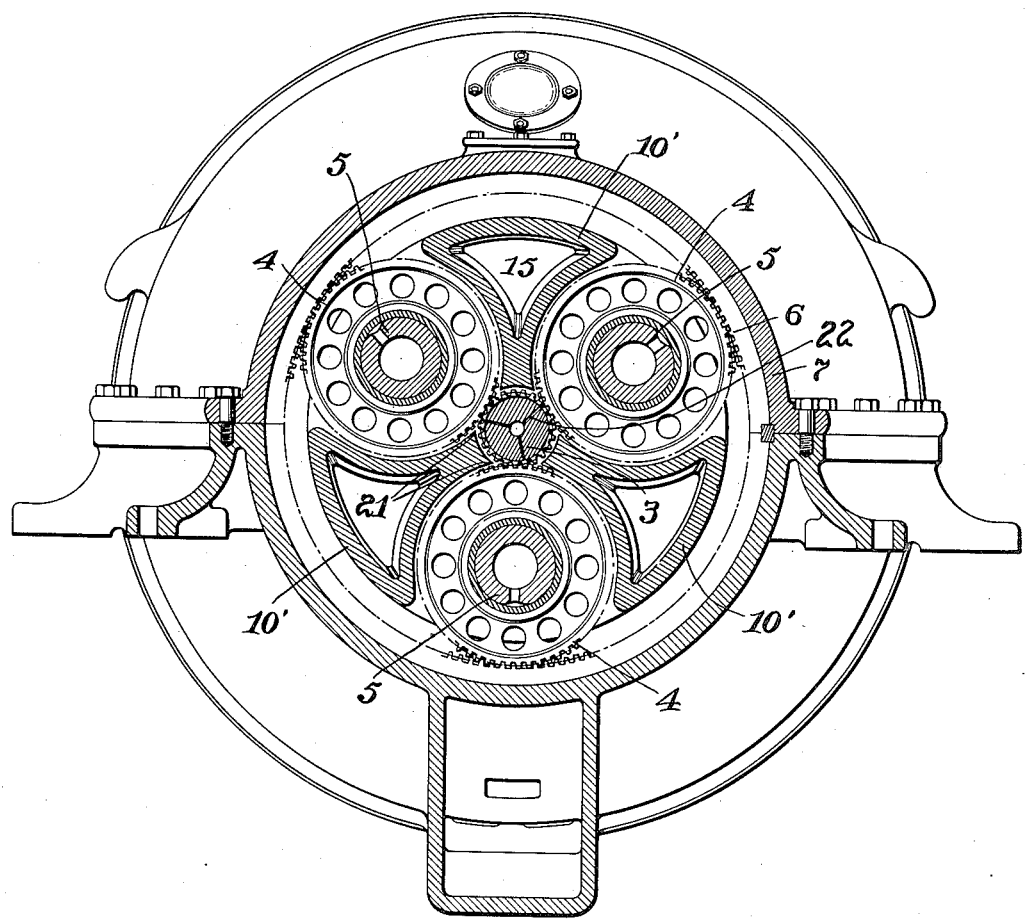
Fig. 4 is a cross sectional view of the apparatus shown in Fig. 3.

In transmission apparatus of large diameter I prefer, as shown in Figs. 3 and 4, to make a cage for supporting the spindles of the planetaries of one casting with the heads 8' and 9' and the transverse connections 10' between them all in one piece, and I make these connections 10' between the heads hollow as at 15 for lightness. They are of sufficient size or extent to practically fill the space between the planetaries as shown in Fig. 4, and they are of curved shape to conform substantially to the peripheries of the planetaries and center pinion.

The cage, as shown, has hollow journals 16, 17, working in fixed bearings 18, 19 extending inwardly from the main casing. The journal at one end of the cage is large enough in internal diameter to receive the center pinion, which, therefore can be moved axially into place or removed therefrom.

In the construction shown in Figs. 3 and 4 I have illustrated a transmission with a double reduction from the high to the low speed. In other words this form of the apparatus includes a high speed unit and an intermediate speed unit, which transmits power to a low speed shaft. In this case the intermediate speed shaft 2, or what may be termed the low speed shaft of the first reduction, finds a bearing within and is keyed to the hollow journal 17 of the cage of the right hand unit, this hollow journal in turn being supported in the bearing 19 carried by the casing, as above described. The center pinion of the right hand unit finds a pilot bearing by its journal 20 working in a seat or bearing in the shaft 2 of the center pinion $3^a$ of the second speed unit. This low speed unit has its right hand journal $16^a$ of sufficiently large diameter to permit the insertion of the center pinon $3^a$ and its shaft, and this right hand journal is supported in the bearing $18^a$, extending in from the main casing. The left hand hollow journal $17^a$ of the low speed unit receives within it the low speed shaft $3^b$ and it is supported and turns in a bearing $19^a$ within the casing and the center pinion of this left hand unit finds a pilot bearing $20^a$ in the low speed shaft $3^b$ of the second reduction. The cage of the second unit has a construction similar in all substantial respects to that of the first unit above described, in that it has heads $8^a$ and $9^a$ and the hollow cross stays $10^a$ formed integrally with the heads, these stays extending through the spaces between the planetaries which latter are supported on spindles like those above described mounted in the heads and held by set screws. The cage of the second unit is, however, larger than that of the first unit.

The cross connections or stays 10' of the cage perform another function in addition to that of strengthening the structure for it will be noticed from Fig. 4 that these cross connections extend close to the periphery of the planetaries and to the center pinion, leaving a comparatively narrow space between, and that their points 21 lie close to the points at which the center pinion meshes with the planetaries. For lubricating the center pinions and planetaries radial oil passages 22 are provided in the center pinion leading from the duct 23, so as to conduct the oil from the center to the toothed periphery of the pinion and to the planetaries. Under high speed the oil will be thrown out through these passages, but in the construction shown in the patent the oil will not be effectively directed to the planetaries, or the intermeshing points of the pinions and planetaries, except when the radial ports of the pinion coincides with the radius of the planetary or is approaching or just leaving this position. With the cross piece construction of cage or head, however, the inner surfaces of these act as means for retaining or directing the oil to the points where the teeth of the center pinion and planetaries intermesh, serving to confine the oil against dissipation outwardly of the casing under centrifugal force.

Reverting to the first unit it will be seen that its shaft 1 finds a bearing at $20^a$ in the fixed frame, its inner end, as above stated, having a reduced extension at 20, which bears in a recess of the shaft 2, of the second unit.

What I claim is:

1. In power transmission apparatus and in combination a fixed casing, shafts in alinement, gearing for driving one shaft from the other consisting of a central gear on one shaft, an internal gear stationary and mounted on the fixed casing, planetary gears between the central gear and the internal gear and meshing therewith, spindles on which the planetary gears are mounted, a cage comprising heads in which the spindles are held and connecting means between the heads disposed at different points about the same and extending in the spaces between the planetaries and holding the heads in fixed relation to each other, said cage having a hollow journal at one end surrounding one of the shafts, a bearing in the fixed casing for said journal, the other end of said cage having a journal surrounding the other shaft, substantially as described.

2. In power transmission apparatus and in combination a fixed casing, shafts in alinement, gearing for driving one shaft from the other consisting of a central gear on one shaft, an internal gear stationary and mounted on the fixed casing, planetary gears between the central gear and the internal gear, and meshing therewith, spindles on which the planetary gears are mounted, a cage comprising heads in which the spindles are held, and connecting means between the heads disposed at different points about the same and extending in the spaces between the planetaries and holding the heads in fixed relation to each other, said cage having a hollow journal at one end surrounding one of the shafts, a bearing in the fixed casing for said journal, the other end of the said shaft having a journal fixed to the other shaft, and a bearing in the frame for second journal, substantially as described.

3. In power transmission apparatus and in combination a fixed casing, shafts in alinement, gearing for driving one shaft from the other consisting of a central gear on one shaft, an internal gear stationary and mounted on the fixed casing, planetary gears between the central gear and the internal gear, and meshing therewith, spindles on which the planetary gears are mounted, a cage comprising heads in which the spindles are held, and connecting means between the heads disposed at different points about the same and extending in the spaces between the planetaries and holding the heads in fixed relation to each other, means for conducting oil to the meshing points of the center pinion and the planetaries, said cross connecting means between the heads acting as baffle means to prevent the oil from being thrown from the points of service, substantially as described.

4. In power transmission apparatus and in combination, a fixed casing, shafts in alinement, gearing for driving one shaft from the other consisting of a central gear on one shaft, an internal gear stationary and mounted on the fixed casing, planetary gears between the central gear and the internal gear, and meshing therewith, spindles on which the planetary gears are mounted, a cage comprising heads in which the spindles are held, and connecting means between the heads disposed at different points about the same and extending in the spaces between the planetaries and holding the heads in fixed relation to each other said cross connecting means between the heads on their sides conforming substantially to the peripheries of the planetaries and extending at their inner ends close to the center gear, and to the points where the same meshes with the planetaries, substantially as described.

5. In power transmission apparatus and in combination a fixed casing, shafts in alinement, gearing for driving one shaft from the other consisting of a central gear on one shaft, an internal gear stationary and mounted on the fixed casing, planetary gears between the central gear and the internal gear, and meshing therewith, spindles on which the planetary gears are mounted, a cage comprising heads in which the spindles are held, and connecting means between the heads disposed at different points about the same and extending in the spaces between the planetaries and holding the heads in fixed relation to each other, said cross connecting means being hollow and substantially filling the space surrounding the center pinion and between the planetaries, substantially as described.

6. In combination, a high speed shaft, an intermediate speed shaft, and a low speed shaft, all in alinement, a fixed casing, internal gears stationary on the fixed casing, one surrounding the high speed shaft, and the other surrounding the intermediate speed shaft, a center pinion on the high speed shaft, a pinion on the intermediate speed shaft, planetaries between the pinions and the internal gears, cages in which said planetaries are mounted, bearings on the fixed frame, one for each end of the cage of the high speed unit, said cage being connected to the shaft of the intermediate speed unit, a bearing on the fixed frame for the end of the cage of the intermediate speed unit, adjacent the frame bearing of the first cage, said cage of the intermediate unit being secured to the low speed shaft, substantially as described.

7. In combination, a high speed shaft, an intermediate speed shaft, and a low speed shaft, all in alinement, a fixed casing, internal gears stationary on the fixed casing, one surrounding the high speed shaft, and the other surrounding the intermediate speed shaft, a center pinion on the high speed shaft, a pinion on the intermediate speed shaft, planetaries between the pinions and the internal gears, cages in which said planetaries are mounted, bearings on the fixed frame, one for each end of the cage of the high speed unit, said cage being connected to the shaft of the intermediate speed unit, a bearing on the fixed frame for the end of the cage of the intermediate speed unit, adjacent the frame bearing of the first cage, said cage of the intermediate unit being secured to the lower speed shaft, and a frame bearing for the other end of the cage of the intermediate speed unit, substantially as described.

8. In power transmission apparatus and in combination a fixed casing, shafts in alinement, gearing for driving one shaft from the other consisting of a central gear on one shaft, an internal gear stationary and mounted on the fixed casing, planetary gears between the central gear, and the internal gear, and meshing therewith, spindles on which the planetary gears are mounted, a cage comprising heads in which the spindles are held, and connecting means between the heads disposed at different points about the same and extending in the spaces between the planetaries and holding the heads in fixed relation to each other, said connections joining the heads integrally, one head being connected to the lower speed shaft, and the other head having an integral hollow journal of an internal diameter sufficient to permit the insertion or withdrawal of the center pinion and its shaft and a fixed frame bearing for said hollow journal, substantially as described.

In testimony whereof, I affix my signature.

GUSTAVE FAST.